(12) United States Patent
Konttori et al.

(10) Patent No.: US 10,412,281 B2
(45) Date of Patent: Sep. 10, 2019

(54) DEVICE WITH SPLIT IMAGING SYSTEM

(71) Applicant: Microsoft Technology Licensing, LLC, Redmond, WA (US)

(72) Inventors: Urho Konttori, Helsinki (FI); Marko Eromäki, Tampere (FI); Eero Tuulos, Ylöjärvi (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 15/175,006

(22) Filed: Jun. 6, 2016

(65) Prior Publication Data
US 2017/0353639 A1 Dec. 7, 2017

(51) Int. Cl.
| | |
|---|---|
| *H04N 5/225* | (2006.01) |
| *G03B 17/00* | (2006.01) |
| *G02B 7/02* | (2006.01) |
| *G06F 3/14* | (2006.01) |
| *G02B 7/00* | (2006.01) |
| *G03B 7/00* | (2014.01) |
| *G03B 11/04* | (2006.01) |

(52) U.S. Cl.
CPC ............. *H04N 5/2254* (2013.01); *G02B 7/00* (2013.01); *G03B 7/00* (2013.01); *G03B 11/04* (2013.01); *G03B 17/00* (2013.01); *H04N 5/2252* (2013.01); *H04N 5/2253* (2013.01)

(58) Field of Classification Search
CPC .... H04N 5/2252; H04N 5/247; H04N 5/2254; H04N 5/2253; G03B 11/04; G03B 17/00; G03B 7/00; G06F 3/1446; H05K 5/0226; H05K 5/03; G02B 7/02; G02B 15/10; G02F 2201/305; H01L 29/66977

USPC .................. 348/373–376, 360, 787, 788, 78; 396/348, 535, 429; 455/575.3
See application file for complete search history.

(56) References Cited

U.S. PATENT DOCUMENTS

| | | |
|---|---|---|
| 4,072,970 A | 2/1978 | Winkler |
| 6,172,709 B1 | 1/2001 | Yamano et al. |
| 6,334,718 B1 | 1/2002 | Akiba et al. |
| 6,898,301 B2 | 5/2005 | Iwanaga |
| 6,940,891 B2 | 9/2005 | Clary et al. |
| 7,106,357 B2 | 9/2006 | Fukuda et al. |
| 7,496,378 B2 | 2/2009 | Kawamura |

(Continued)

FOREIGN PATENT DOCUMENTS

CN 204578622 U 8/2015

OTHER PUBLICATIONS

"International Search Report and Written Opinion Issued in PCT Application No. PCT/US2017/034358", dated Jul. 31, 2017, 10 Pages.

(Continued)

*Primary Examiner* — Marly S Camargo

(57) ABSTRACT

A device comprising at least two body sections is disclosed. The first body section comprises a movable imaging unit and a magnet rigidly fixed to the imaging unit, and the second body section comprising an optical unit with a magnet rigidly fixed to the optical unit. The body sections are in a movable connection with each other, and the device is operable in at least two modes. In the first mode, the imaging unit and the optical unit are fixed in a set relative position due to magnetic interaction between the magnets. In the second mode, the imaging unit is positioned away from the optical unit.

20 Claims, 5 Drawing Sheets

(56) References Cited

U.S. PATENT DOCUMENTS

| | | |
|---|---|---|
| 7,654,755 B2 | 2/2010 | Orf et al. |
| 7,660,613 B2 | 2/2010 | Hamamura et al. |
| 7,677,817 B2 | 3/2010 | Vapaakoski |
| 7,692,667 B2 | 4/2010 | Nguyen et al. |
| 8,041,201 B2 | 10/2011 | Eromaki et al. |
| 8,610,822 B2 | 12/2013 | Weber et al. |
| 8,633,989 B2 | 1/2014 | Okuda |
| 8,639,106 B1 | 1/2014 | Gleason et al. |
| 8,699,141 B2 | 4/2014 | Aschwanden et al. |
| 8,738,101 B1 | 5/2014 | Myr |
| 8,803,816 B2 | 8/2014 | Kilpatric et al. |
| 9,065,991 B2 | 6/2015 | Galstian et al. |
| 9,106,819 B1 | 8/2015 | Gao et al. |
| 9,871,954 B2* | 1/2018 | Eromaki .............. H04N 5/2252 |
| 10,021,281 B2* | 7/2018 | Konttori ............. H04N 5/2254 |
| | | 348/360 |
| 10,142,526 B2* | 11/2018 | Eromaki ............. H04N 5/2254 |
| | | 348/360 |
| 2003/0036365 A1 | 2/2003 | Kuroda |
| 2003/0040346 A1* | 2/2003 | Fukuda ................ G06F 1/1616 |
| | | 455/575.1 |
| 2004/0116166 A1* | 6/2004 | Makishima ......... H04M 1/0214 |
| | | 455/575.1 |
| 2004/0183935 A1* | 9/2004 | Shimano ............ H04M 1/0214 |
| | | 348/335 |
| 2004/0252987 A1 | 12/2004 | Kobayashi |
| 2006/0033818 A1* | 2/2006 | Wada .................... G03B 17/00 |
| | | 348/208.11 |
| 2006/0056837 A1 | 3/2006 | Vapaakoski |
| 2006/0172761 A1 | 8/2006 | Im et al. |
| 2006/0203124 A1 | 9/2006 | Park et al. |
| 2006/0234786 A1* | 10/2006 | Taniguchi ............... H04M 1/00 |
| | | 544/575 |
| 2006/0272328 A1* | 12/2006 | Hara .................... G02B 27/646 |
| | | 60/527 |
| 2008/0165439 A1 | 7/2008 | Chang |
| 2008/0220817 A1* | 9/2008 | Nagamine ........... H04M 1/0264 |
| | | 455/556.1 |
| 2009/0015706 A1 | 1/2009 | Singh |
| 2010/0045855 A1 | 2/2010 | Tanida et al. |
| 2010/0194860 A1 | 8/2010 | Mentz et al. |
| 2013/0163980 A1 | 6/2013 | Lazaridis et al. |
| 2014/0009631 A1 | 1/2014 | Topliss |
| 2014/0022655 A1 | 1/2014 | Cheng et al. |
| 2014/0063265 A1 | 3/2014 | Shukla et al. |
| 2014/0285476 A1 | 9/2014 | Cho et al. |
| 2014/0368711 A1 | 12/2014 | O'brien |
| 2014/0368731 A1 | 12/2014 | Hyers |
| 2015/0015777 A1 | 1/2015 | Osborne et al. |
| 2015/0038768 A1 | 2/2015 | Saitoh et al. |
| 2015/0062422 A1 | 3/2015 | Stern |
| 2015/0288865 A1 | 10/2015 | Osborne |
| 2016/0212332 A1* | 7/2016 | Tang .................. H04N 5/23232 |
| | | 348/208.13 |
| 2017/0353633 A1 | 12/2017 | Eromaki |
| 2017/0353638 A1 | 12/2017 | Konttori et al. |
| 2018/0007252 A1* | 1/2018 | Tuulos ............... H04N 5/23212 |
| | | 348/218.1 |

OTHER PUBLICATIONS

"Samsung has an 18.4? Tablet in the making—could fold into two when Idle", Retrieved from: https://web.archive.org/web/20150810213557/https://bestmobs.com/samsung-an-18-4-tablet-making-27645/ , Aug. 5, 2015, 5 Pages.

"Non Final Office Action Issued in U.S. Appl. No. 15/174,988", dated Apr. 28, 2017, 13 Pages.

By, Andre, "Aligning Optics", Retrieved from: http://www.vision-systems.com/articles/print/volume-16/issue-4/features/aligning-optics.html, Apr. 1, 2011, 7 Pages.

Griffiths, Sarah, "Samsung's 'Foldable Valley' Could ILunch in January: Flexible Phone Uses a Bendy Plastic Display to Open and Close Like a Book", Retrieved from: http://www.dailymail.co.uk/sciencetech/article-3236809/Samsung-s-Foldable-Valley-launch-January-Fiexible-smartphone-uses-bendy-plastic-display-open-close-like-book.html, Sep. 16, 2015, 17 Pages.

"International Search Report and Written Opinion Issued in PCT Application No. PCT/US2017/034356", dated Aug. 22, 2017, 12 Pages.

"International Search Report and Written Opinion Issued in PCT Application No. PCT/US2017/034357", dated Jul. 31, 2017, 11 Pages.

Thrystan, "Samsung Flip Foldable Phone Features a Wrap Around Screen", Retrieved from: https://www.concept-phones.com/samsung/samsung-flip-foldable-phone-features-wrap-screen/, Jan. 9, 2012, 2 Pages.

* cited by examiner

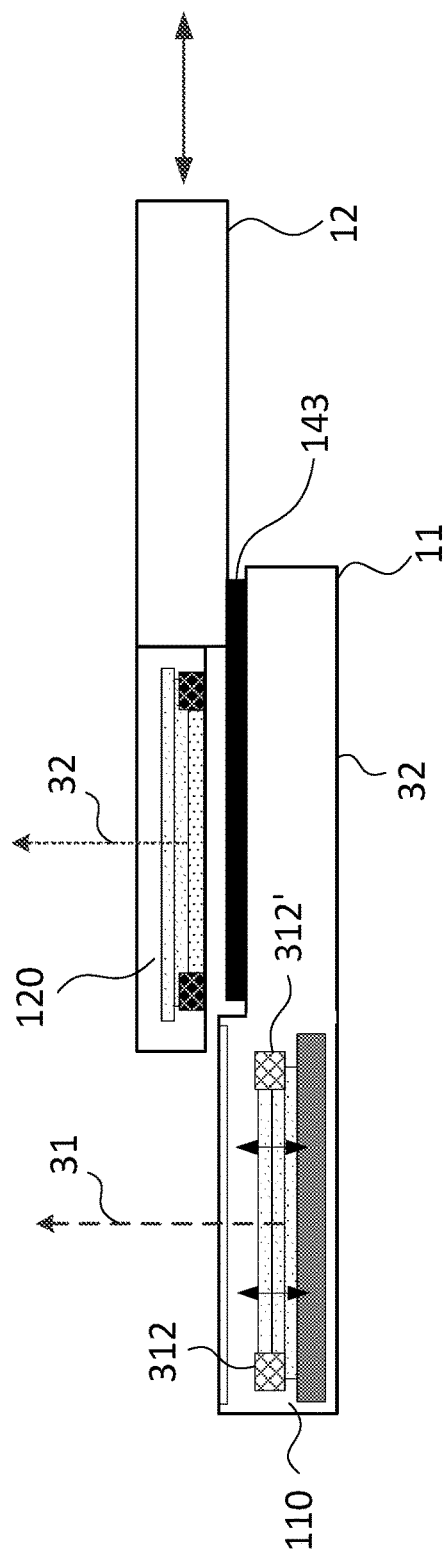
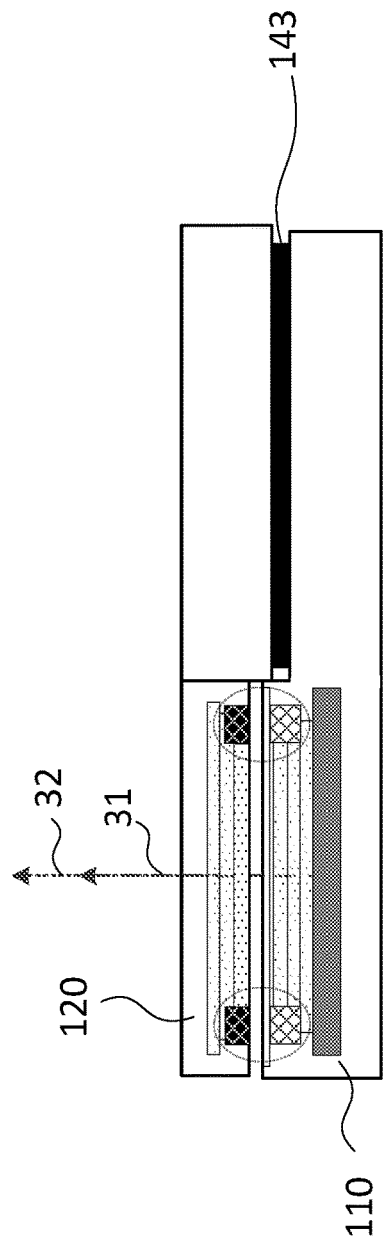

DEVICE WITH SPLIT IMAGING SYSTEM

BACKGROUND

Digital cameras may be incorporated in various types of mobile devices. Such digital cameras may be used to capture still images and/or videos comprising a plurality of sequential images. One type of mobile devices with digital cameras relates to devices manufactured in more than one part, such as sliding, folding or modular devices. Sliding and folding devices can have more than one camera operating separately or simultaneously.

The quality and properties of the captured images may be affected by use of various types of accessories for a camera. Some accessories may require careful alignment to affect camera performance, for example optical accessories such as lenses and focusing elements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Electronic devices having a split camera are disclosed. The specification provides implementations of a device with two or more parts and camera elements integrated in at least two of these parts. The device has different working modes depending on the relative position of the camera elements. In the first (working) mode, the camera elements are brought together to work as a camera, aligned and fixed in position by a locking arrangement that includes a movable imaging unit and magnets.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 3A is a schematic illustration of a sliding device according to an embodiment;

FIG. 3B is a schematic illustration of a closed sliding device according to the embodiment of FIG. 3A;

The drawings of the Figures are not necessarily to scale. Like reference numbers are used to designate like parts in the accompanying drawings.

DETAILED DESCRIPTION

The detailed description provided below in connection with the appended drawings is intended as a description of a number of embodiments and is not intended to represent the only forms in which the embodiments may be constructed, implemented, or utilized.

The drawings of the Figures represent the principles of embodiments, especially the structural details, schematically. Structural details of the devices and elements, as well as materials thereof, may be implemented and selected in any appropriate manner. Smaller elements can be illustrated larger for clarity, and the proportions may not be observed.

Among terms used hereinafter, a "camera" refers to a device, module, unit, or element comprising at least an image sensor capable of capturing digital image frames comprising image data, which can be used to reproduce and display digital images. A "camera" may be implemented, for example, as a plain digital image sensor which is connected to appropriate external power supply and control unit(s) and equipped with appropriate housing and an optical system. In another embodiment, a camera may be implemented as an imaging module or camera module which itself may comprise, in addition to the actual digital image sensor element, also any appropriate mechanical and optical elements as well as control electronics.

A "mobile device" may be a mobile electronic device of any type having at least one camera. Such mobile device may be, for example, a tablet computer, a phablet, a smartphone or a mobile phone, a gaming console, a wearable device, etc.

A "magnetic element" may be any element capable of desired interaction with a magnetic field. This term herein covers magnets, ferromagnetic materials, ferrimagnetic materials, antiferromagnets, paramagnetic materials, diamagnetic materials and electromagnets. Where appropriate, paired magnetic elements are elements that are capable of magnetic attraction or repulsion towards each other.

The devices shown in the Figures may be electronic devices, mobile devices, portable and other devices with a camera split in at least two parts defined as an imaging unit 110 and an optical unit 120. Examples of how the camera splits between the body sections will be better understood from the detailed description below. A split camera can be used in split devices with limited body section thickness, especially if a localized non-uniformity in thickness of the body of the device is undesirable.

Figure 1A:
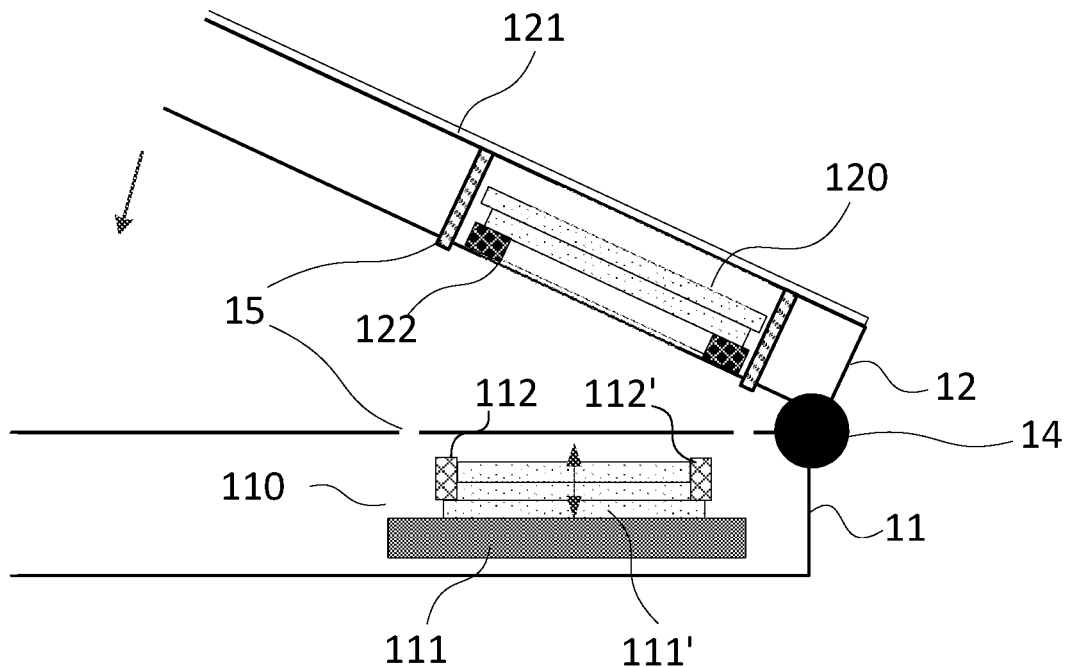
FIG. 1A is a schematic illustration of a foldable device according to an embodiment.

The device in FIG. 1A comprises two body sections 11 and 12. These body sections 11, 12 may each comprise various parts of the device such as electronics, displays, keyboards, wireless modules and others. The body sections 11, 12 are named "first" and "second" for clarity only, and for any set of elements described below in relation to these sections the first and second body sections 11, 12 are interchangeable.

The first body section 11 is in a movable connection with the second body section 12. In an embodiment shown in FIGS. 1A-1B a hinge 14 provides the movable connection, and the device of this embodiment is a foldable device configured to fold about the hinge 14. The hinged 14 foldable connection is described as an example only, and embodiments with other movable connections are possible, some of them discussed below.

Figure 1B:
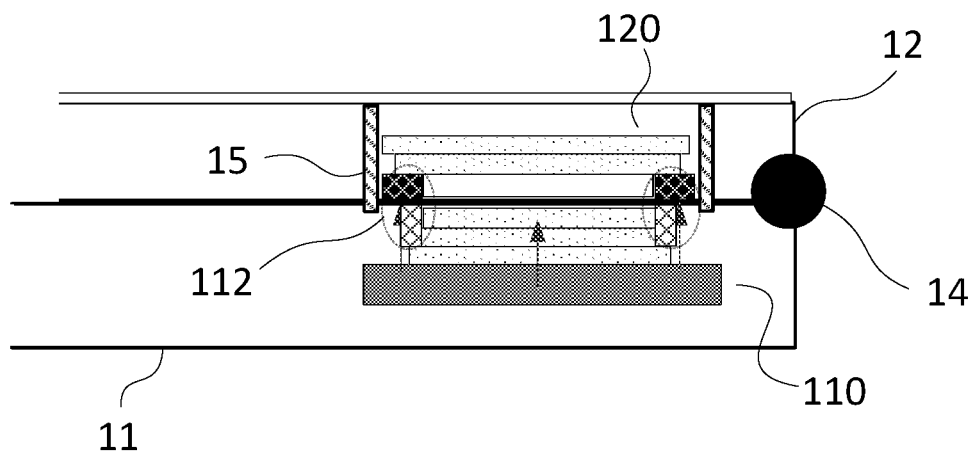
FIG. 1B is a schematic illustration of a folded device according to the embodiment of FIG. 1A.

The first body section 11 comprises an imaging unit 110. The imaging unit 110 is a unit configured to capture images and comprises an image sensor 111. FIGS. 1A-1B also show a stack of other elements 111' in the imaging unit which may comprise, for example, a lens barrel, individual lenses, other optical elements, a substrate, a glass window on the bottom, a connection interface configured to connect the image sensor 111 with other electronics, and other elements. In an embodiment, the imaging unit 110 itself may be an operable digital camera. In an alternative embodiment, the imaging unit is not operable as a standalone camera without the optical unit 120 described further. The imaging unit 110 is movable in at least one dimension within a predetermined space, as shown by a directional arrow on FIGS. 1A-1B. This means that the imaging unit 110 is a floating element not fixed rigidly to the rest of the device, and does not exclude that the imaging unit 110 may be locked in a predetermined set position under certain circumstances The first body section 11 also comprises at least one magnetic element 112, 112' rigidly fixed to the imaging unit 110. Most Figures in this specification show two magnetic elements such as 112 and 112', this is for demonstration purposes only. Any number of magnetic elements may be used in each body section according to embodiments, and the magnetic elements may have any suitable shape including, but not limited to, a ring, a flap, a leaf, a brick etc.

The second body section 12 comprises an optical unit 120. The optical unit 120 comprises at least one additional optical element, illustrated on FIGS. 1A-1B as a stack of three elements for illustration purposes only. The optical unit 120 is positioned to match, with a certain accuracy, the imaging unit 110 when they are brought together by closing the device. The second body section 12 also comprises at least one magnetic element 122 rigidly fixed to the optical unit 120. As explained in relation to magnetic elements 112, 112', the device may comprise any number of magnetic elements in each body section.

The device is operable in at least two modes. In the first mode the first and second body sections 11, 12 are positioned such that the imaging unit 110 and the optical unit 120 are fixed in a set relative position. The set relative position is defined by the relative distance and tilt between the imaging unit 110 and the optical unit 120. These parameters remain the same in the first mode, to a certain degree of accuracy, throughout the use of the device. The fixing occurs due to magnetic interaction between the at least one magnetic element 112, 112' fixed to the movable imaging unit 110, and the at least one magnetic element 122 fixed to the optical unit 120. The first mode is illustrated on FIG. 1B and the magnetic interaction indicated by dotted ovals. The moving parts, i.e. the floating imaging unit 110 and optionally the movable optical unit 120, are drawn towards each other by magnetic attraction, and this drives the imaging unit 120 into a correctly aligned position relative to the optical unit 120.

The optical unit 120 and the imaging unit 110 are thereby combined to operate as a camera that can capture images through the optical unit 120 onto the image sensor 111. FIG. 1B shows the first mode, and it is a folded mode in this embodiment.

In the second mode the first body section 11 and the second body section 12 are positioned such that the imaging unit 110 is positioned away from the optical unit 120. In the embodiment shown in FIG. 1A the second mode can be any unfolded position of the device, including halfway folded or flat positions. In the second mode, the imaging unit 110 may still be active and capture images onto the image sensor 111 through an aperture (not shown) or transparent part of the casing of the first body section 11. In other embodiments, the second operation mode is an idle mode for the split camera, i.e. for both the imaging unit 110 and optical unit 120.

The split camera provides opportunities to make foldable or sliding or otherwise multi-part devices thinner in the camera region, while maintaining premium quality of the combined camera. The arrangement of magnetic elements disclosed herein has a technical effect of accurate alignment and locking of the relative position of the imaging unit 110 and the optical unit 120. This accuracy also remains throughout repeated activation of the first and second modes of the device, opening and closing of the body sections 11, 12, since magnetic attraction can drive the elements into the same spot with high repeatability.

According to an embodiment, the optical unit 120 is rigidly fixed to the second body section 12. The optical unit 120 shown in FIGS. 1A-1B may be, for example, fixed to the inner side of the material of the second body section 12. In an alternative embodiment, the optical unit 120 is also a floating element movable in a predetermined space.

In an embodiment, the imaging unit 110 and the optical unit 120 have optical axes that are aligned in the first mode with a certain degree of accuracy. The set relative position of the units 110, 120 provides such alignment. In an embodiment, one or more mechanical alignment elements 15 are used to connect the body sections 11, 12. As shown on FIGS. 1A-1B, as an example only, the mechanical alignment elements 15 may include pins in the second body section 12 and holes in the first body section 11 or vice versa. The feature 15 is optional. This provides the effect of improved horizontal alignment between the imaging unit 110 and the optical unit 120 because it negates at least partially the error in alignment caused by mismatching the body sections 11, 12.

In an embodiment, an allowable degree of inaccuracy referred to herein can be outlined by approximately 10-micron positioning accuracy in the vertical dimension, approximately 50-micron positioning accuracy in the horizontal plane and approximately 10-minute tilting accuracy.

In the Figures presented herein, the imaging unit 110 and the optical unit 120 are positioned in the same part of the device as the hinge 14, which leaves less room for misalignment of the units 110, 120. In some devices the hinge 14 or another connecting element is on the opposite side of the device, in which case the mechanical means of fixing and aligning body sections 11, 12 can be used to greater effect.

The optical unit 120 may include additional passive and/or active optical elements. The passive additional optical elements include one or more additional lenses, optical filters, for example polarization filters, and other elements which affect properties of the resulting image captured by the image sensor 111. For example these properties can be the spectrum, polarization state of light incident on and propagating through the optical element, field of view of the resulting image, colors etc. For example, the optical unit 120 may include a lens which changes the field of view resulting camera, making the pictures more appropriate for scenery shots in the first mode and for portrait or selfie shots in the second mode as a technical effect.

Passive additional optical elements do not require the optical unit 120 to be electrically connected to the imaging unit 110 or other elements of the device 10, which reduces the amount of connectors needed. This also provides synergy with magnetic fixing of a position of the imaging unit 110, which also does not rely on an electric connection. A technical effect is that the first and second modes of the device 10 can be activated mechanically without the software or hardware "recognizing" the position of the first and second body sections 11, 12. The first mode can be activated by bringing the body sections 11, 12 together and using the aligned imaging unit 110 and optical unit 120 together as a combined camera, and the second mode can be activated by bringing the body sections 11, 12 apart and using the device in an opened position.

The active additional optical elements comprised in the optical unit 120 are elements which can perform an active function. In an embodiment, the active optical element is a focusing element, for example an autofocus. According to embodiments, the active optical element can also be an image stabilization element or a deformable lens. In order to perform the active function, the optical unit 120 is electrically connected to the imaging unit 110 or a processor and synchronized with the imaging unit 110 in the first mode. The second body section 12 may comprise sufficient space for the optical unit 120 with active additional optical elements to perform lateral or vertical movement of the stabilization elements or autofocus. The optical unit 120 may also comprise a shutter as an active additional optical element. The shutter can be configured to open in the first mode and close in the second mode of the device, or the shutter may be configured to be synchronized with the imaging unit to open only for a period of time necessary to take a picture, in accordance with predetermined exposure time, or to shoot a video.

The device may also comprise protective glass 121 on either side of the body sections 11, 12.

Figure 2A:
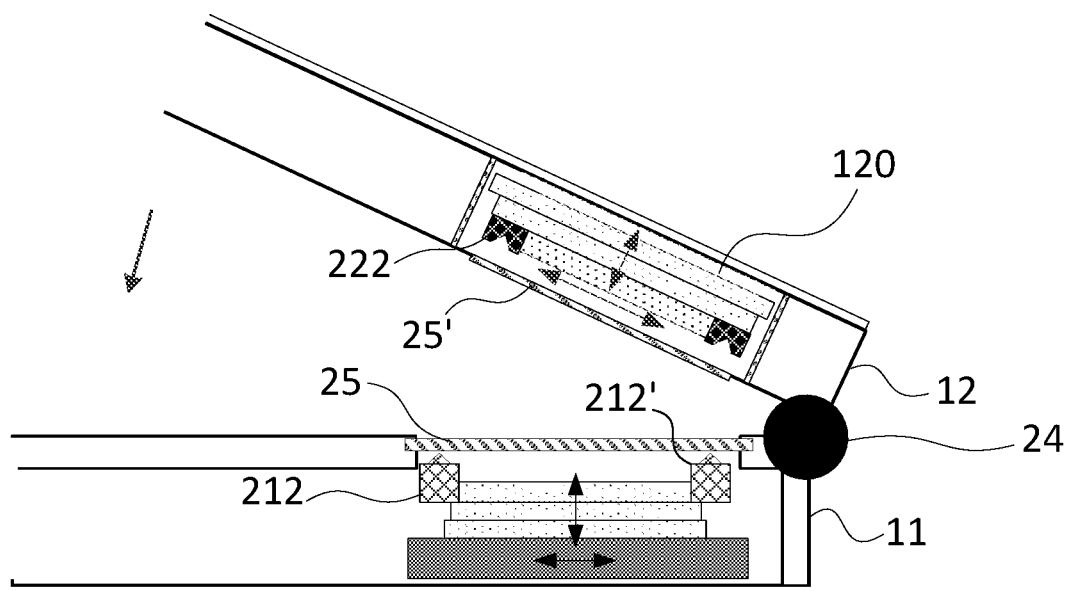
FIG. 2A is a schematic illustration of a foldable device with shutters according to an embodiment.
Figure 2B:
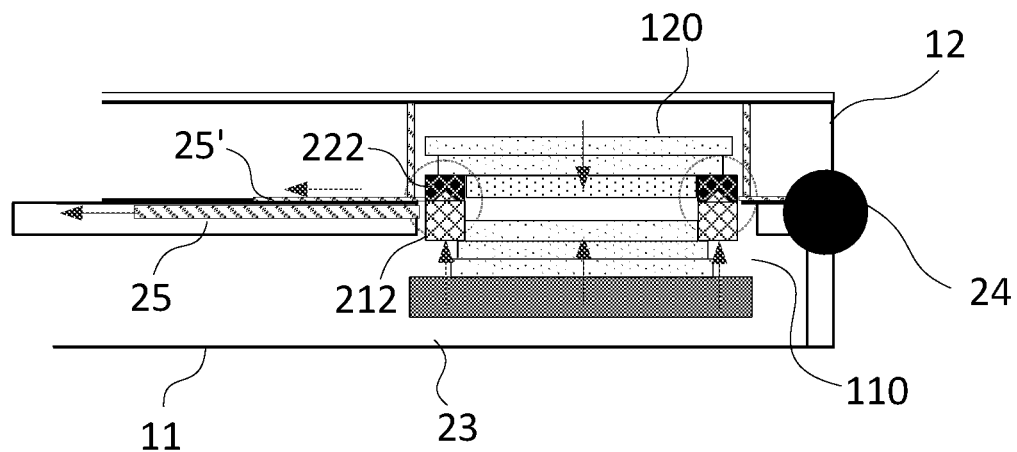
FIG. 2B is a schematic illustration of a folded device according to the embodiment of FIG. 2A.

As shown schematically on FIGS. 2A-2B, in an embodiment the first body section 11 and the second body section 12 each comprise at least one mechanical shutter 25, 25'. The mechanical shutters 25 are adapted to expose the imaging unit 110 and the optical unit 120 in the first mode as shown in FIG. 2B; and protect the imaging unit 110 and the optical unit 120 in the second mode, as shown in FIG. 2A. In the example shown on FIGS. 2A-2B, the optical unit 120 may also be movable in at least one dimension within a predetermined space, as shown by directional arrows on FIG. 2A. This means that the optical unit 120 is a floating element not fixed rigidly to the rest of the device, and does not exclude that the optical unit 120 may be locked in a predetermined set position under certain circumstances.

The shutters 25, 25' are shown to be of different types. The first body section 11 illustrated in FIGS. 2A-2B has thicker walls in its casing, which provides room for the shutter 25 to be retracted to. This can be done, for example, by a retraction mechanism including springs, other mechanical means of retraction, magnets or an electric motor. The shutter 25' is a thinner mechanical element which can be configured for example to slide or move away along the walls of the second body section 12. The shutters 25, 25' may have any shape and are not limited to the illustrated flaps. For example, the shutters 25, 25' may arch over one side of each body section 11, 12. The shutters 25, 25' can be adapted to retract or move away, exposing the units 110, 120 underneath them, when the device is closed and the first mode is activated. In the second mode when the imaging unit 110 and the optical unit 120 are away from each other, at least the shutters 25 can be adapted to limit the movement of the imaging unit. If the optical unit 120 is also movable, the shutter 25' can also be adapted to limit the movement of the optical unit 120 in the second mode.

In an embodiment, the first body section 11 comprises at least one aperture aligned with the imaging unit 110 which is adapted to be movable through the first aperture towards the second body section 12 in the first mode. The imaging unit may be adapted to retract into the first body section 11 in the second mode. In an embodiment, only one or more magnetic elements 212, 222 fixed to the corresponding unit 110, 120 pass through the aperture. Magnetic elements 212, 222 can extend outside the corresponding unit 110, 120 and, in the first mode, fix the units 110, 120 in a position wherein a gap of predetermined dimensions is left between them, and the units 110, 120 can remain in the body sections 11, 12. In embodiments, the second body section 12 may also comprise a matching aperture to allow physical contact between the magnetic elements. In one such embodiment, in the set relative position of the imaging unit 110 and the optical unit 120 at least one magnetic element 212 rigidly fixed to the imaging unit 110 is in physical contact with at least one magnetic element rigidly 222 fixed to the optical unit 120. As shown in FIGS. 2A-2B, the shape of at least one magnetic element 212, 212' rigidly fixed to the imaging unit 110 may be aligned with the shape of the at least one magnetic element 222 rigidly fixed to the optical unit 120. The shapes may include any matching combinations such as pins, holes, triangular, rectangular, round etc. The technical effect achieved is that magnets 212, 222 always lock in substantially the same position as the shape guides the interacting elements to the same relative position under magnetic attraction. The magnetic elements 212 in the embodiment shown on FIGS. 2A-2B also extend higher than the upper surface of the imaging unit 110, this structure is demonstrated as an example only. Since the imaging unit 110 is movable, with the magnetic elements 212 positioned as shown in FIGS. 2A-2B, only the magnets 212 need to pass through the aperture exposed by the shutters 25, 25' to set the imaging unit 110 and the optical unit 120 into a set relative position in the first mode.

In an embodiment where the optical unit 120 is a movable unit, it can be adapted to pass through the aperture towards the first body section 11 in the first mode, and retract back into the second body section 12 in the second mode. If both the optical unit 120 and the imaging unit 110 are adapted to pass through the corresponding apertures in the body sections 12, 11, then the units 110, 120 can be fixed in a set relative position by physical contact in any of the body sections 12, 11 or between them.

In other embodiments, magnetic attraction generated through the material of the window or body sections between the imaging and optical units 110, 120 is sufficient for locking the units in a set position. Alternatively, in an embodiment wherein the magnetic elements 112, 122, 212, 222 extend outside of the corresponding units 110, 120, the body sections 11, 12 may comprise smaller apertures through which the magnetic elements are adapted to move, and the entire units 110, 120 remain inside the body sections 11, 12. The interface between the imaging unit 110 and the optical unit 120 may comprise uninterrupted glass or any other transparent material suitable for their combined operation.

In further embodiments, the mechanical shutters 25, 25' can also be adapted to prevent the movable imaging unit 110 and optionally optical unit 120 from unwanted outward movement in the second mode by blocking the apertures, and release such movement in the first mode by clearing the apertures. In FIGS. 2A-2B, the whole area of interface between the imaging unit 110 and the optical unit 120 constitutes an aperture. The units 110, 120 are adapted to move towards each other through the aperture when the shutters 25, 25' are open. When the magnets 212, 222 are in sufficient proximity to be affected by magnetic attraction, the units 110 and 120 lock in the set relative position.

In FIGS. 3A-3B the device differs from that of FIGS. 1-2 at least in that, instead of a hinge 14, a sliding element 143 is used. The element 143 provides a sliding movable connection between the first body section 11 and the second body section 12, schematically indicated by movement arrows. The first mode of the device, illustrated on FIG. 3B, similarly includes alignment of the optical unit 120 with the imaging unit 110, and the in the second mode they optical unit 120 is positioned away from the imaging unit 110. The modes are activated by sliding of the second body section 12 relative to the first body section 11. In this embodiment, the optical unit 120 can be concealed by the corresponding parts of the first body section 11 and/or the slider in the second mode, or the device may additionally include a mechanical flap to cover the optical unit 120. The shape of the first body section 11 shown in FIGS. 3A-3B matches the shape of the second body section 12 for better alignment of the units 110, 120. This is a variation of mechanical or structural alignment elements that create at least one locked state of the body sections 11, 12. The locked state coincides with the first operation mode of the device, and a second possibly locked state that keeps the device open coincides with the second operation mode. In other embodiments, the shape of the casing of the body sections 11, 12 can be flat or curved or have any other suitable structure. Among technical effects of the sliding arrangement as shown in FIGS. 3A-3B is the ease of implementation of the first and second mode without a need for additional protective elements such as a mechanical flap.

FIGS. 3A-3B also illustrate optical axes 31, 32 of the imaging unit 110 and the optical unit 120. Alignment of the optical axes can be desirable in several embodiments, including the abovementioned ones, because it allows using stacked optical elements effectively. The set relative position of the units 110, 120 provides alignment of the first optical axis 31 with the second optical axis 32, as illustrated in FIGS. 3A-3B.

Material of the casing of body sections 11, 12 may be any suitable material or combination of materials such as glass, plastic, metal and others. Without regard to the material of the whole casing, all elements and materials of the casing of body sections 11, 12 along the optical axes of the imaging unit 110 and the optical unit 120 are transparent to light. The light can be of appropriate wavelengths so that it can reach the image sensor 111 both in the first mode and in the second mode. The wavelength depends on the type of the image sensor 111, for example for a digital photo camera the image sensor may be sensitive to light of wavelength from approximately 350 nanometers to 1000 nanometers, or to a narrower spectrum between approximately 400 and 700 nanometers. Any subranges are also possible for specific image sensor types.

In an embodiment where the first body section 11 comprises an aperture aligned with the imaging unit 110, the first body section 11 can also comprise a limiting element. The limiting element is adapted to limit the motion of the imaging unit 110. This provides further control of the position of the imaging unit 110, and can prevent unwanted outward motion. The same arrangement can apply to the second body section 12 and the optical unit 120.

The device may be operable in more than two modes according to embodiments. The mode in which the optical unit 120 is exposed and used with the imaging unit 110, and the mode in which the optical unit is concealed and the imagining unit is either idle or functions independently, can be few of a plurality of modes of operation of the device and the imaging unit 110.

According to an embodiment, the device comprises a digital alignment element adapted to monitor the relative position of the imaging unit 110 and the optical unit 120. In the first mode of the device, the digital alignment element additionally adjusts the position of the imaging unit 110 such that the imaging unit 110 and the optical unit 120 are fixed in a set relative position. The digital alignment element may comprise a distance measurement element, a misalignment monitoring system, a misalignment compensation system etc. The digital alignment element can be used in addition to the mechanical magnetic alignment according to previous embodiments, and can provide increased accuracy of the alignment of the imaging unit 120 in all dimensions.

In the embodiments wherein magnetic elements of the first body section 11 and of the second body section 12 come into physical contact in the first mode, the shapes of the magnetic elements can be matched to aid in relative alignment of the units 110, 120. For example, a sloped shape may drive the magnetic element into a right spot, or high friction on one end can provide for a rigid connection. The shape may also include a mechanical locking mechanism which can be unlocked when entering the second operation mode by a use prompt or automatically. An example of shape matching of magnets is shown in FIGS. 2A-2B.

The device may include at least one display attached to any side of the first and second body sections 11, 12.

Figure 4A:
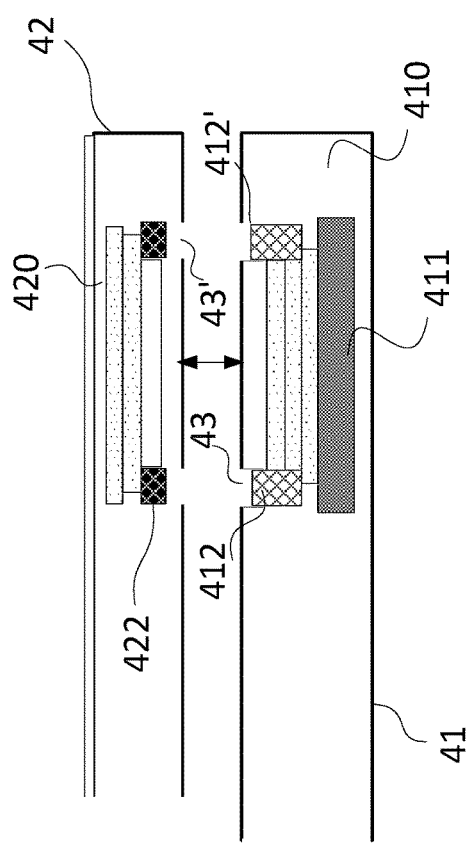
FIG. 4A is a schematic illustration of a system according to an embodiment.
Figure 4B:
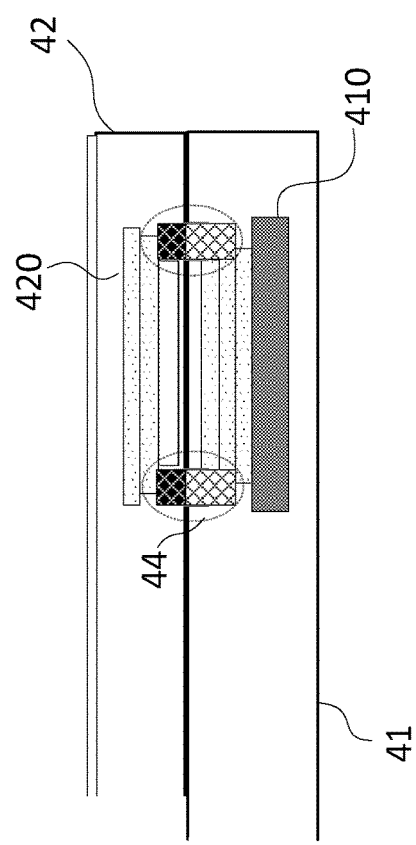
FIG. 4B is a schematic illustration of the system according to the embodiment of FIG. 4A with modules attached.

FIGS. 4a-4b illustrate a system according to an aspect. The system comprises a first module 41 comprising an imaging unit 410 with an image sensor 411 and at least one magnetic element 412, 412' rigidly fixed to it. The system also comprises a second module 42 comprising an optical unit 420 and at least one magnetic element 422 rigidly fixed to the optical unit 420. The first module 41 is attachable to, and detachable from, the second module 42. The imaging unit 410 is movable in at least one dimension within a predetermined space in the first module 41, and when the first module 41 is attached to the second module 42, the imaging unit 410 and the optical unit 420 are fixed in a set relative position due to magnetic interaction between the magnetic elements 412, 412' and 422. When the first module is detached from the second module, the imaging unit 410 is positioned away from the optical unit 420.

The detached mode of the system corresponds to the second mode of the above devices, and the attached mode corresponds to the first mode. The system also illustrates an embodiment wherein apertures 43 are made for the magnetic elements 412, 422, while the entire units 410, 420 remain in the modules 41, 42. In this example, the apertures are maintained opened and positioned outside of the interface area between the imaging unit 410 and the optical unit 420.

Some or all of the above embodiments have a technical effect of making use of the separate body sections that a foldable, sliding or modular device may have. The split imaging and optical units that can supplement each other when the device is closed operate in synergy with any of the presented structures. The embodiments described herein may be used in combination with any number of additional cameras that the device may have.

Figure 5:
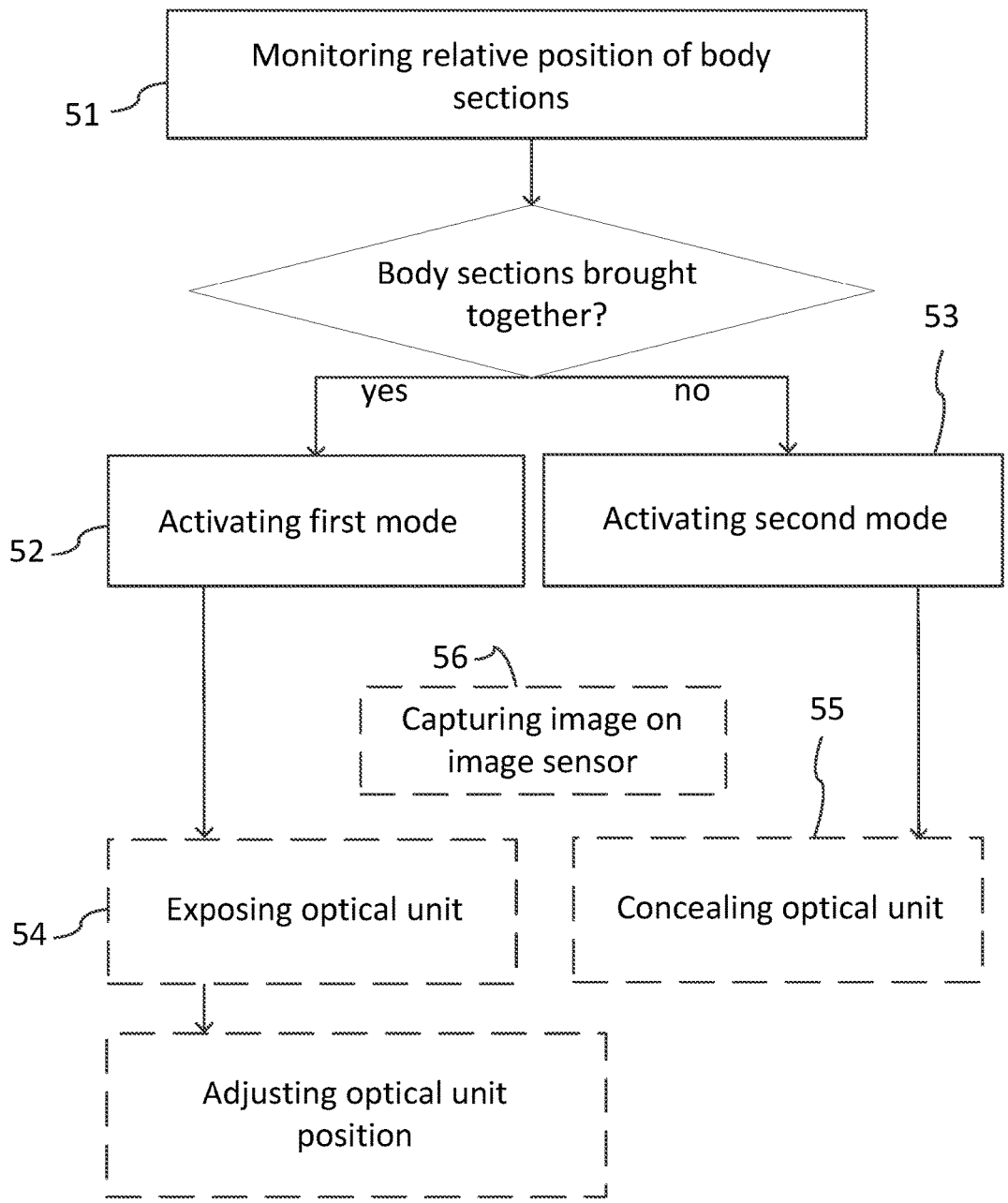
FIG. 5 is a block diagram of a method according to an aspect.

FIG. 5 is a flow chart of a method according to an aspect. It is a method of operating a device comprising a processor; a first body section with a movable imaging unit and at least one magnet fixed to it, a second body section with an optical unit and at least one magnet rigidly fixed to the optical unit, and a digital alignment element, the first and second body sections being in a movable connection. A controller, a processing unit or a processor of the device can carry out the method. Optional parts of the method are illustrated by boxes with dashed borders.

The method comprises 51 monitoring the relative position of the imaging unit and the optical unit by receiving detections made by the digital alignment element. The detections may be received periodically at a predetermined rate. First mode of the device is activated 52 upon receipt of a detection from the digital alignment element that the imaging unit and the optical unit are brought together. The digital alignment element is then prompted to adjust 56 the position of the imaging unit such that the imaging unit and the optical unit are fixed in a set relative position.

A second operation mode of the device is activated 53 upon receipt of a detection from the digital alignment element that the optical unit is positioned away from the imaging unit.

The method may also comprise capturing 54 an image formed on an image sensor of the imaging unit in the first mode of the device or in the second mode of the device, and storing the captured image in a memory. The image capture may be prompted by a command from an image capture control unit, manual image capture interface or image capture software.

In an embodiment, activating 52 the first mode of the device comprises activating a first camera mode in a camera software of the device, and activating 53 the second mode comprises activating a second camera mode in the camera software of the device. The software may have predetermined or user-defined settings for each operation mode, which according to the method activate automatically upon activation of the first and second mode. For example, the software may comprise instructions to activate a scenery mode when the first mode of the device is activated, and activate a portrait or selfie mode when the second mode of the device is activated.

According to an embodiment, the method also comprises exposing 57 the optical and imaging units upon activation of the first mode of the device, and concealing 55 the units upon activation of the second mode of the device. The concealing 55 and exposing 57 may be carried out mechanically or by sending a command to an electric motor configured to move the shutter or flap.

The functionally described features can be performed by a processor, or, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Embodiments are further discussed shortly in the following.

According to a first aspect, a device is provided. The device comprises: a first body section comprising an imaging unit and at least one magnetic element rigidly fixed to the imaging unit, and a second body section comprising an optical unit and at least one magnetic element rigidly fixed to the optical unit. The first body section is in a movable connection with the second body section, the imaging unit is movable in at least one dimension within a predetermined space, and the device is operable in at least two modes. In the first mode, the first body section and the second body section are positioned such that the imaging unit and the optical unit are fixed in a set relative position due to magnetic interaction between the at least one magnetic element rigidly fixed to the imaging unit and the at least one magnetic element rigidly fixed to the optical unit. In the second mode, the first body section and the second body section are positioned such that the imaging unit is positioned away from the optical unit.

In an embodiment, in addition to the above embodiment, the first body section comprises a first aperture aligned with the imaging unit, and the at least one magnetic element rigidly fixed to the imaging unit is adapted to be movable through the first aperture towards the second body section in the first mode.

In an embodiment, in addition to the above embodiment, the second body section comprises a second aperture aligned to match the first aperture in the first mode; at least one magnetic element is adapted to be movable through the first aperture and the second aperture towards the optical unit in the first mode. In the set relative position of the imaging unit and the optical unit, at least one magnetic element rigidly fixed to the imaging unit is in physical contact with at least one magnetic element rigidly fixed to the optical unit.

In an embodiment, alternatively or in addition to the above embodiments, the shape of at least one magnetic element rigidly fixed to the imaging unit is aligned with the shape of the at least one magnetic element rigidly fixed to the imaging unit.

In an embodiment, alternatively or in addition to the above embodiments, the optical unit is movable in at least one dimension within a predetermined space.

In an embodiment, alternatively or in addition to the above embodiments, the first body section and the second body section each comprise at least one mechanical shutter, wherein the mechanical shutters are adapted to expose the imaging unit and the optical unit in the first mode, and protect the imaging unit and the optical unit in the second mode.

In an embodiment, in addition to the above embodiment, the at least one mechanical shutter of the first body section is adapted to limit the movement of the imaging unit in the second mode.

In an embodiment, alternatively or in addition to the above embodiments, the imaging unit has a first optical axis; the optical unit has a second optical axis; and in the set relative position, the first optical axis is aligned with the second optical axis.

In an embodiment, alternatively or in addition to the above embodiments, the device comprises a hinge, wherein the first body section is in a folding movable connection with the second body section; in the first mode the device is folded; and in the second mode the device is unfolded.

In an embodiment, alternatively or in addition to the above embodiments, the device comprises a slider, wherein the first body section is in a sliding movable connection with the second body section via the slider.

In an embodiment, alternatively or in addition to the above embodiments, the imaging unit comprises an image sensor and at least one lens.

In an embodiment, alternatively or in addition to the above embodiments, the optical unit comprises at least one additional optical element, and in the first mode the at least one additional optical element and the imaging unit are operable together as a camera with an optical axis.

In an embodiment, in addition to the above embodiment, at least one additional optical element is a passive optical element selected from the group of: an optical filter and an additional lens.

In an embodiment, alternatively to the above embodiment, at least one additional optical element is an active optical element selected from the group of: a stabilization element, a focusing element and a deformable lens; and the optical unit is electrically connected to the imaging unit.

In an embodiment, alternatively or in addition to the above embodiments, the device comprises a digital alignment element adapted to: monitor the relative position of the imaging unit and the optical unit, and, in the first mode of the device, additionally adjust the position of the imaging unit such that the imaging unit and the optical unit are fixed in a set relative position.

In an embodiment, alternatively or in addition to the above embodiments, the device comprises at least one display attached to the first body section or the second body section.

According to an aspect, a system is disclosed. The system comprises: a first module comprising an imaging unit and at least one magnetic element rigidly fixed to the imaging unit, and a second module comprising an optical unit and at least one magnetic element rigidly fixed to the optical unit. The first module is attachable to the second module, the imaging unit is movable in at least one dimension within a predetermined space in the first module, and when the first module is attached to the second module, the imaging unit and the optical unit are fixed in a set relative position due to magnetic interaction between the at least one magnetic element rigidly fixed to the imaging unit and the at least one magnetic element rigidly fixed to the optical unit, and when the first module is detached from the second module, the imaging unit is positioned away from the optical unit.

In an embodiment, in addition to the above embodiment, the optical unit is movable in at least one dimension within a predetermined space in the second body section.

In an embodiment, in addition to the above embodiment, the first module comprises a first aperture aligned with the imaging unit, the second module comprises a second aperture aligned to match the first aperture in the first mode and aligned with the optical unit, the at least one magnetic element rigidly fixed to the imaging unit is adapted to be movable through the first aperture towards the optical unit in the first mode, and the at least one magnetic element rigidly fixed to the optical unit is adapted to be movable through the second aperture towards the imaging unit in the first mode.

According to an aspect, a method is presented for operating a device comprising a processor, a first body section with a movable imaging unit and at least magnet rigidly fixed to the imaging unit, a second body section with an optical unit and at least one magnet rigidly fixed to the optical unit, and a digital alignment element, the first and second body sections being in a movable connection. The method comprises: monitoring the relative position of the imaging unit and the optical unit by receiving detections made by the digital alignment element, activating a first mode of the device upon receipt of a detection from the digital alignment element that the imaging unit and the optical unit are brought together, prompting the digital alignment element to adjust the position of the optical unit such that the imaging unit and the optical unit are fixed in a set relative position, and activating a second mode of the device upon receipt of a detection from the digital alignment element that the optical unit is positioned away from the imaging unit.

Although some of the present embodiments may be described and illustrated herein as being implemented in a smartphone, a mobile camera, or a tablet computer, these are only examples of a device and not a limitation. As those skilled in the art will appreciate, the present embodiments are suitable for application in a variety of different types of mobile devices such as game consoles or game controllers, various wearable devices, portable cameras and others.

Although the subject matter has been described in language specific to structural features and/or methodological acts, it is to be understood that the subject matter defined in the appended claims is not necessarily limited to the specific features or acts described above. Rather, the specific features and acts described above are disclosed as exemplary forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The embodiments illustrated and described herein as well as embodiments not specifically described herein but within the scope of aspects of the invention constitute exemplary means for operating a device with a split camera. For example, the elements illustrated and described with reference to FIGS. 1A-4B, when configured to perform the operations illustrated and described with reference to FIG. 5, constitute exemplary means for monitoring the relative position of the imaging unit and the optical unit by receiving detections made by the digital alignment element, exemplary means for activating a first mode of the device upon receipt of a detection from the digital alignment element that the imaging unit and the optical unit are brought together, exemplary means for prompting the digital alignment element to adjust the position of the optical unit such that the imaging unit and the optical unit are fixed in a set relative position, and exemplary means for activating a second mode of the device upon receipt of a detection from the digital alignment element that the optical unit is positioned away from the imaging unit.

The term "comprising" is used in this specification to mean including the features followed thereafter, without excluding the presence of one or more additional features.

The invention claimed is:
1. A device comprising:
a first body section comprising:
a first aperture, an imaging unit aligned within the first aperture, and at least one magnetic element rigidly fixed to the imaging unit,
a second body section comprising an optical unit and at least one magnetic element rigidly fixed to the optical unit,
wherein:
the first body section is in a movable connection with the second body section,
the imaging unit is movable within the first aperture, and the device is operable in at least two modes:
in a first mode the first body section and the second body section are positioned such that the imaging unit and the optical unit are fixed in a set relative position due to magnetic interaction between the at least one magnetic element rigidly fixed to the imaging unit and the at least one magnetic element rigidly fixed to the optical unit, and wherein the at least one magnetic element rigidly fixed to the imaging unit is adapted to be movable through the first aperture towards the second body section, and
in a second mode the first body section and the second body section are positioned such that the imaging unit is positioned away from the optical unit.

2. The device as claimed in claim 1, wherein the second body section comprises a second aperture aligned to match the first aperture in the first mode, and
  the at least one magnetic element rigidly fixed to the imaging unit is adapted to be movable through the first aperture and the second aperture towards the optical unit in the first mode.

3. The device as defined in claim 2, wherein in the first mode, the at least one magnetic element rigidly fixed to the imaging unit is in physical contact with the at least one magnetic element rigidly fixed to the optical unit.

4. The device as defined in claim 1, wherein a shape of the at least one magnetic element rigidly fixed to the imaging unit is aligned with a shape of the at least one magnetic element rigidly fixed to the optical unit.

5. The device as defined in claim 1, wherein the optical unit is movable in at least one dimension within a space.

6. The device as defined in claim 1, wherein the first body section and the second body section each comprise at least one mechanical shutter, wherein the mechanical shutters are adapted to expose the imaging unit and the optical unit in the first mode, and protect the imaging unit and the optical unit in the second mode.

7. The device as defined in claim 6, wherein the at least one mechanical shutter of the first body section is adapted to limit a movement of the imaging unit in the second mode.

8. The device as defined in claim 1, wherein the imaging unit has a first optical axis; the optical unit has a second optical axis; and in the set relative position the first optical axis is aligned with the second optical axis.

9. The device as defined in claim 1 comprising a hinge, wherein the first body section is in a folding movable connection with the second body section; in the first mode the device is folded; and in the second mode the device is unfolded.

10. The device as defined in claim 1, comprising a slider, wherein the first body section is in a sliding movable connection with the second body section via the slider.

11. The device as defined in claim 1, wherein
  the optical unit comprises at least one additional optical element, and
  in the first mode the at least one additional optical element and the imaging unit are operable together as a camera with an optical axis.

12. The device as defined in claim 11, wherein at least one additional optical element is a passive optical element selected from a group of: an optical filter and an additional lens.

13. The device as defined in claim 11, wherein
  at least one additional optical element is an active optical element selected from a group of: a stabilization element, a focusing element and a deformable lens; and
  the optical unit is electrically connected to the imaging unit.

14. The device as defined in claim 1, comprising a digital alignment element adapted to: monitor the relative position of the imaging unit and the optical unit, and, in the first mode of the device, additionally adjust a position of the imaging unit such that the imaging unit and the optical unit are fixed in the set relative position.

15. The device as defined in claim 1, further comprising a digital alignment element adapted to activate the first mode.

16. A system, comprising:
  a first module comprising a first aperture, an imaging unit aligned within the first aperture, and at least one magnetic element rigidly fixed to the imaging unit,
  a second module comprising an optical unit and at least one magnetic element rigidly fixed to the optical unit,
  wherein:
  the first module is attachable to the second module,
  the imaging unit is movable within the first aperture, and
  wherein the first module is attached to the second module, the imaging unit and the optical unit are fixed in a set relative position due to magnetic interaction between the at least one magnetic element rigidly fixed to the imaging unit and the at least one magnetic element rigidly fixed to the optical unit, wherein the at least one magnetic element rigidly fixed to the imaging unit is adapted to be movable through the first aperture towards the second module, and
  wherein the first module is detached from the second module, the imaging unit is positioned away from the optical unit.

17. The system as defined in claim 16, wherein the optical unit is movable in at least one dimension within a space in the second module.

18. The system as defined in claim 17, wherein
  the second module comprises a second aperture aligned to match the first aperture and aligned with the optical unit,
  wherein the at least one magnetic element rigidly fixed to the imaging unit is adapted to be movable through the first aperture towards the optical unit, and
  wherein the at least one magnetic element rigidly fixed to the optical unit is adapted to be movable through the second aperture towards the imaging unit.

19. The system as defined in claim 16, wherein the second module comprises a second aperture aligned to match the first aperture,
  wherein the at least one magnetic element rigidly fixed to the imaging unit is adapted to be movable through the first aperture and the second aperture towards the optical unit, and
  wherein the at least one magnetic element rigidly fixed to the imaging unit is in physical contact with the at least one magnetic element rigidly fixed to the optical unit.

20. A method of operating a device comprising a processor, a first body section with a first aperture, an imaging unit aligned within the first aperture, and at least magnet rigidly fixed to the imaging unit, a second body section with an optical unit and at least one magnet rigidly fixed to the optical unit, wherein the imaging unit is movable within the first aperture via the at least magnet rigidly fixed to the imaging unit that is adapted to be movable through the first aperture towards the second body section, and a digital alignment element, the first and second body sections being in a movable connection; the method comprising:
  monitoring a relative position of the imaging unit and the optical unit by receiving detections made by the digital alignment element,
  activating a first mode of the device upon receipt of a detection from the digital alignment element that the imaging unit and the optical unit are brought together,
  prompting the digital alignment element to adjust a position of the optical unit such that the imaging unit and the optical unit are fixed in a set relative position, and
  activating a second mode of the device upon receipt of a detection from the digital alignment element that the optical unit is positioned away from the imaging unit.

* * * * *